June 27, 1933.  A. S. MITCHELL  1,915,329
UPHOLSTERY MAKING MACHINE
Filed March 18, 1929  16 Sheets-Sheet 8
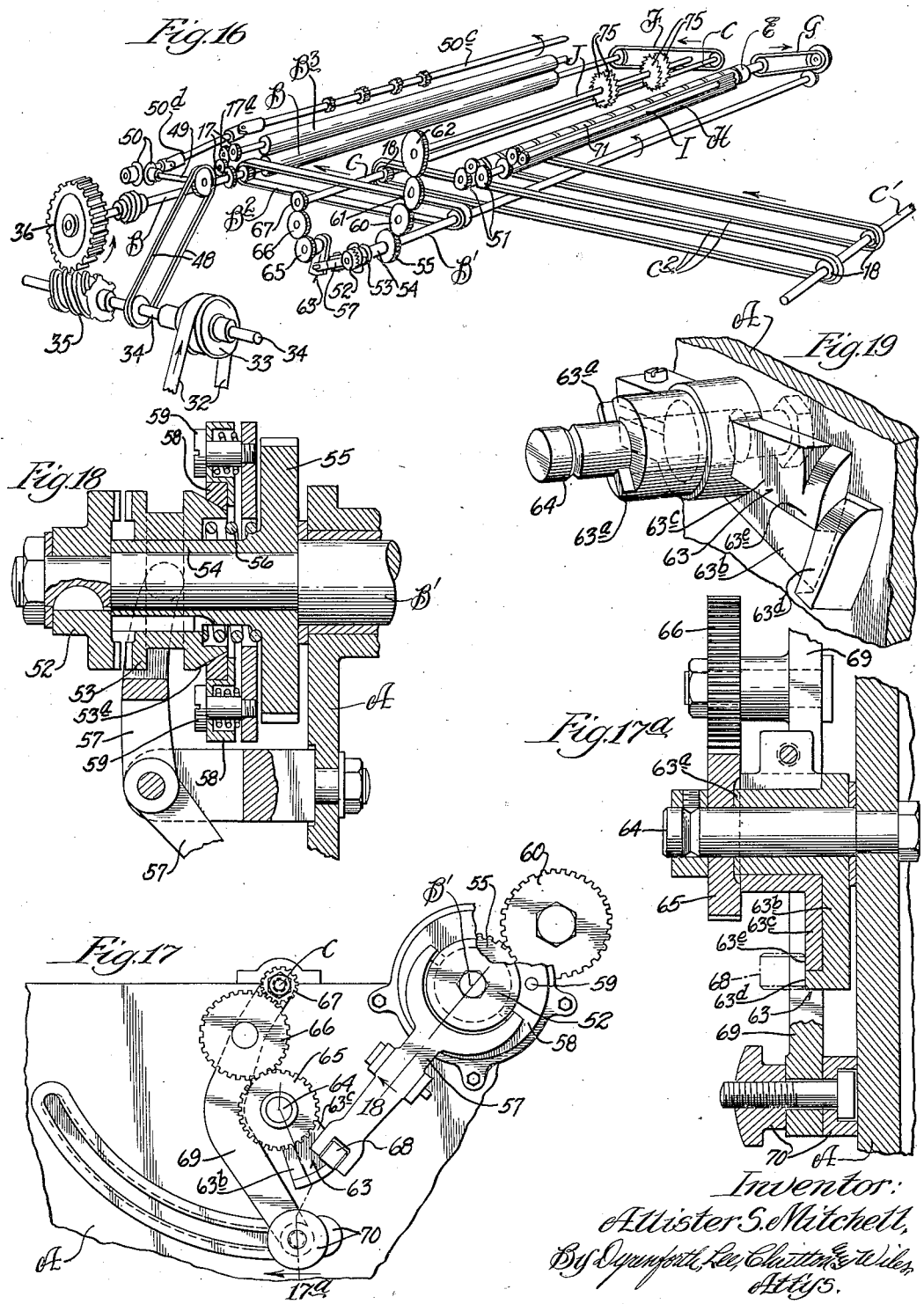

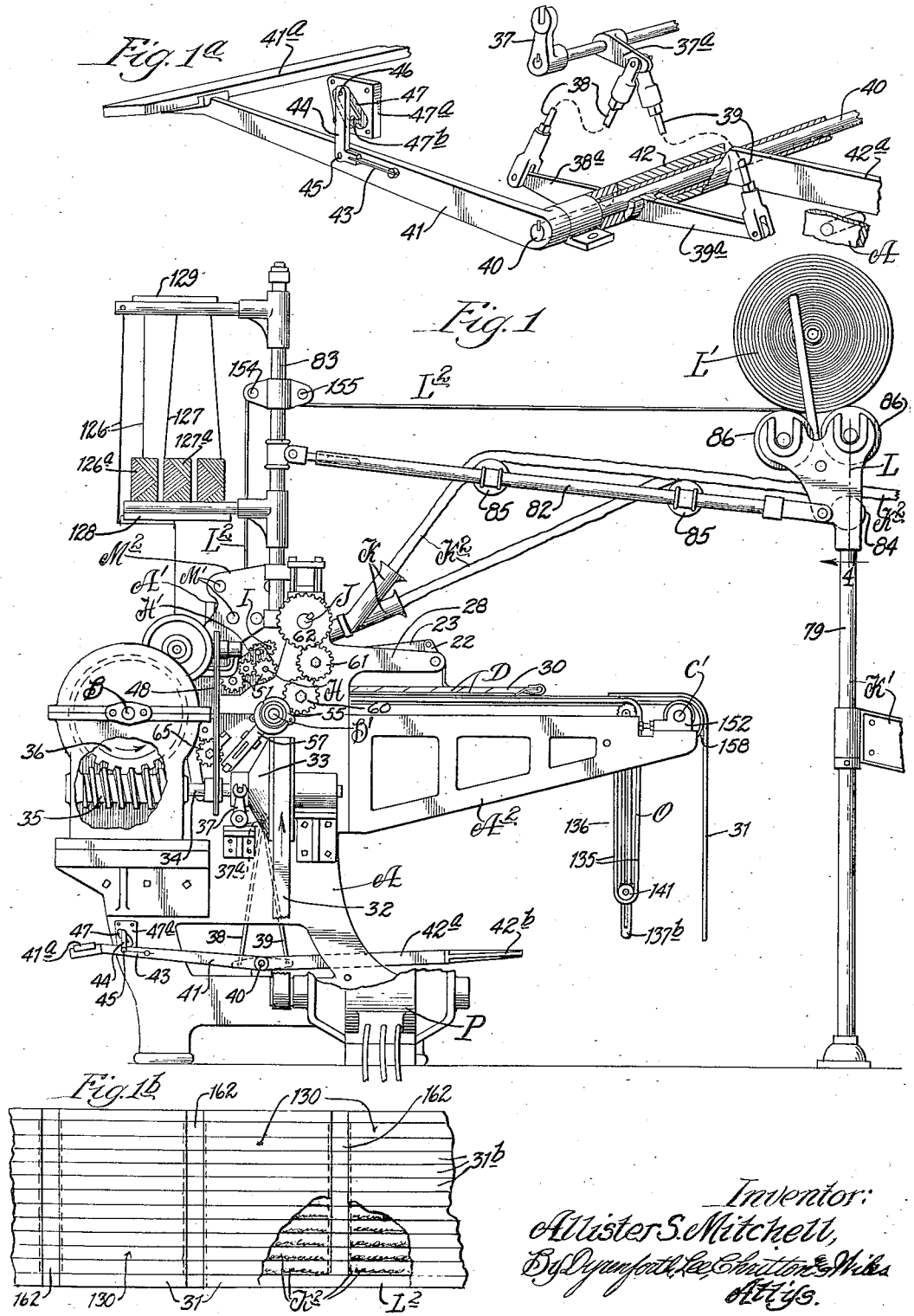

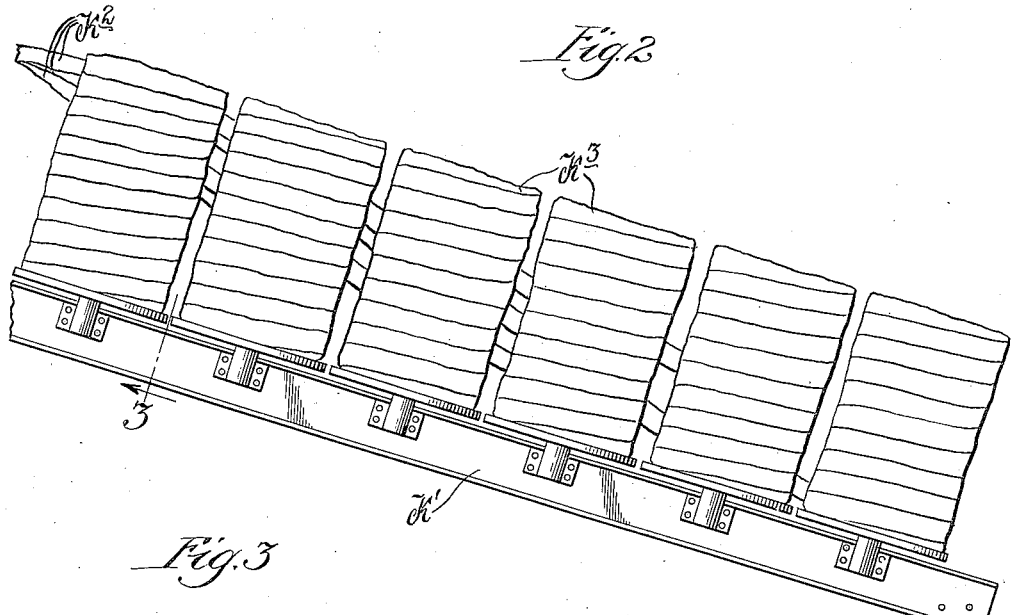
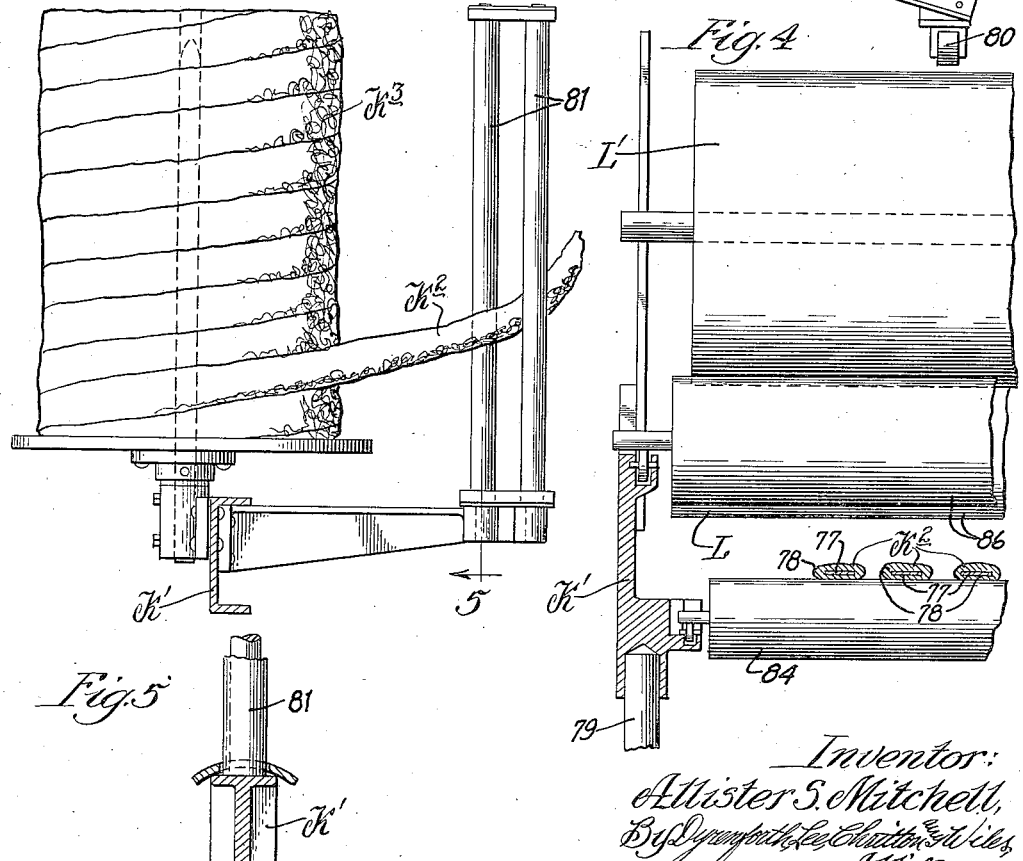

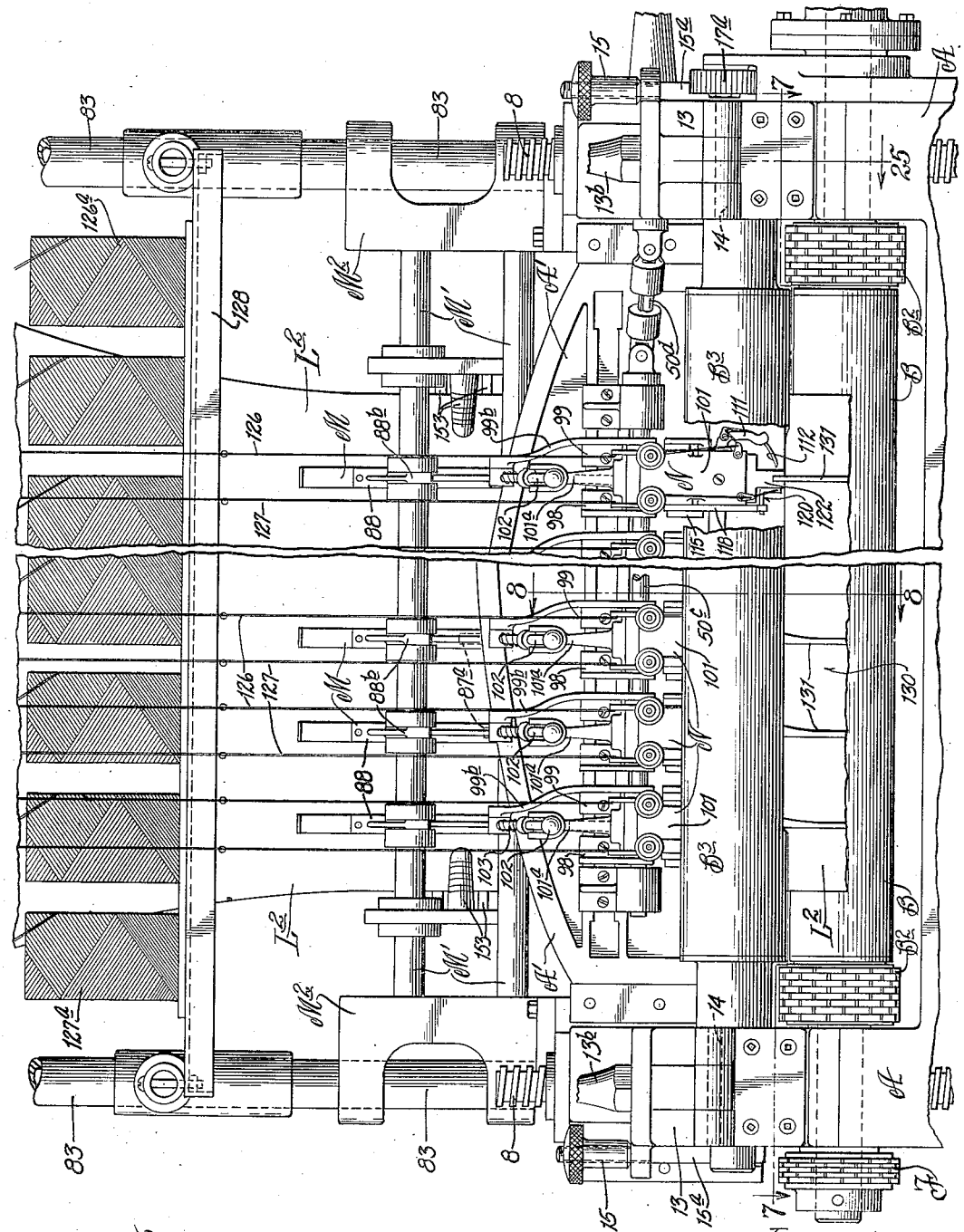

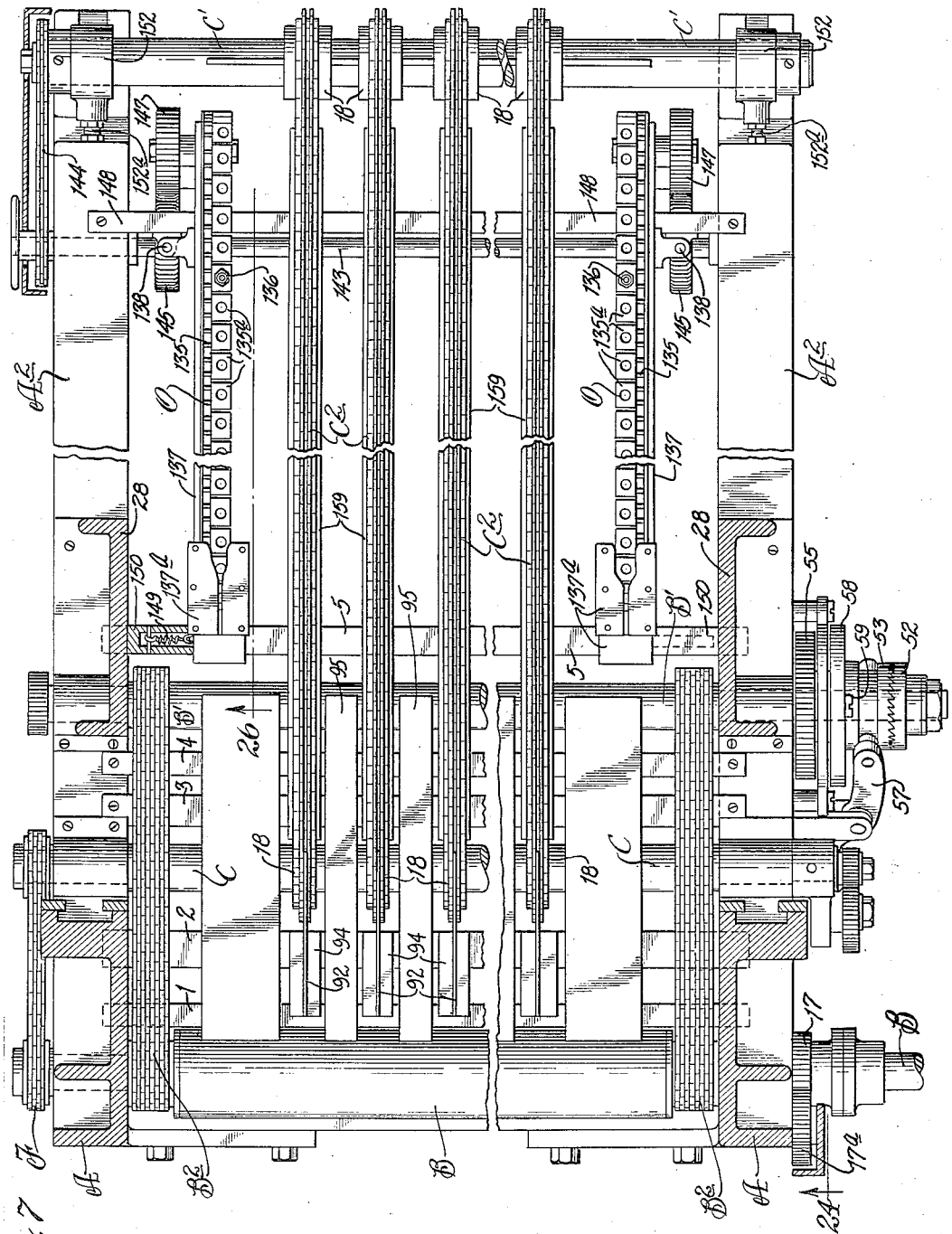

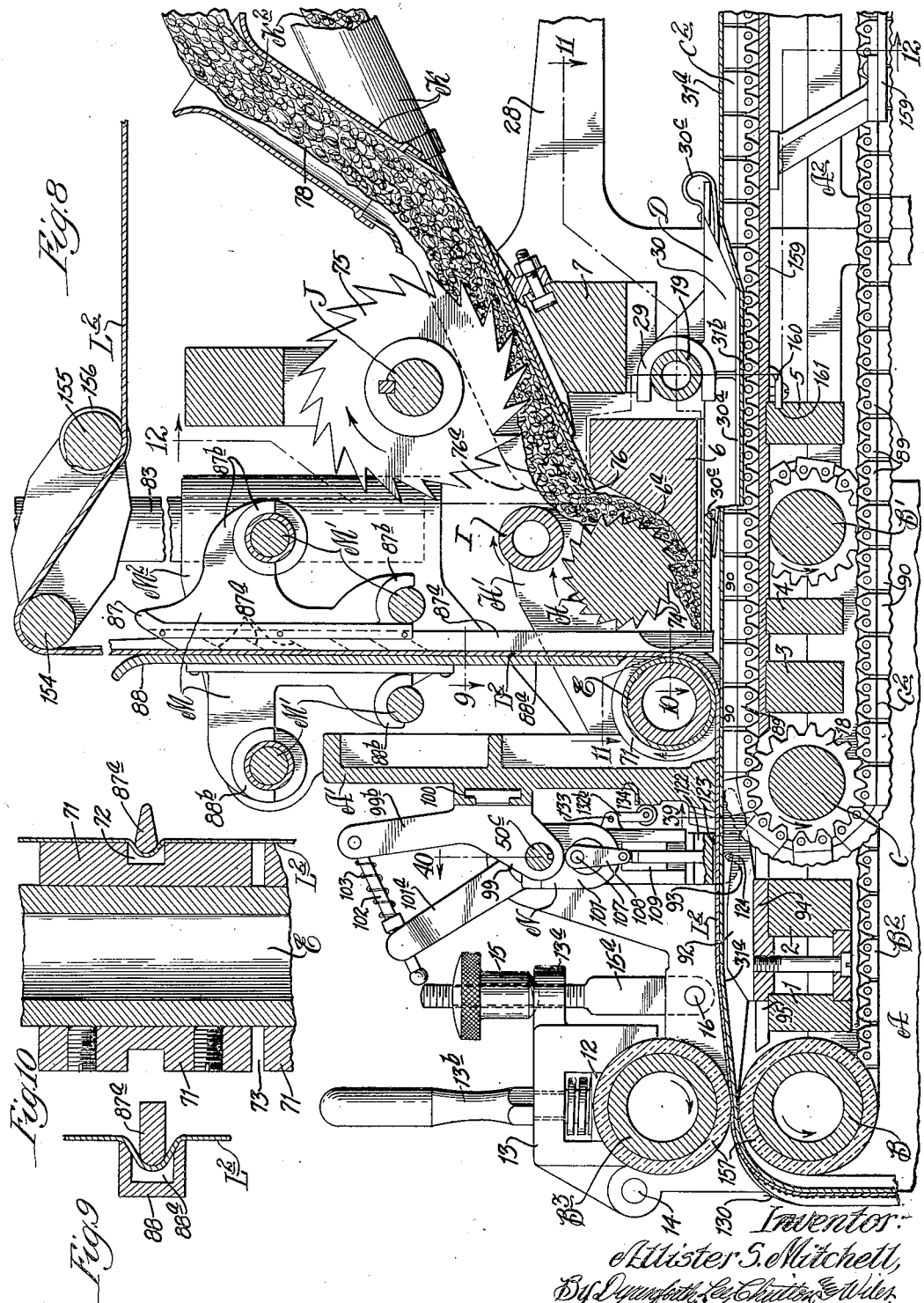

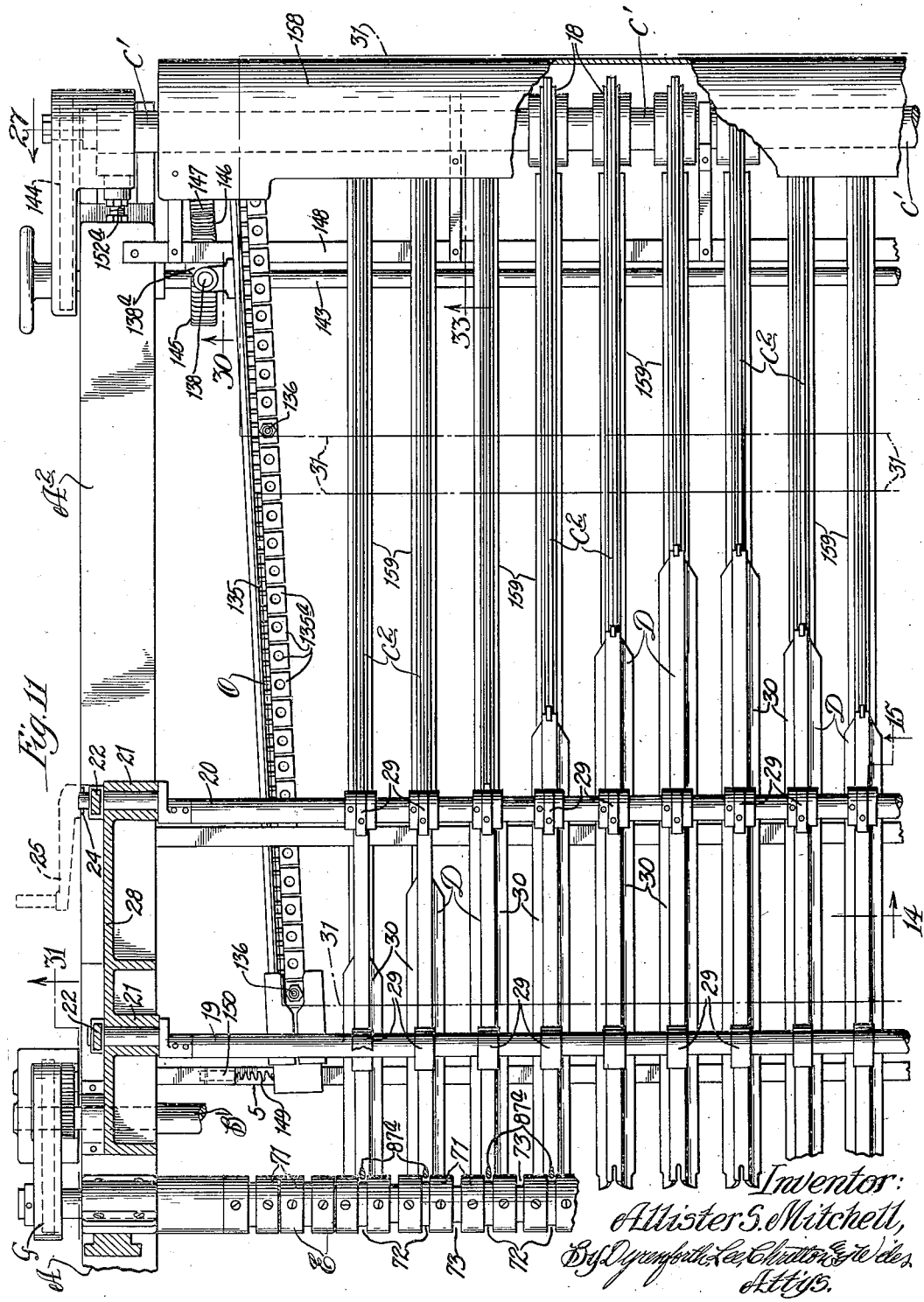

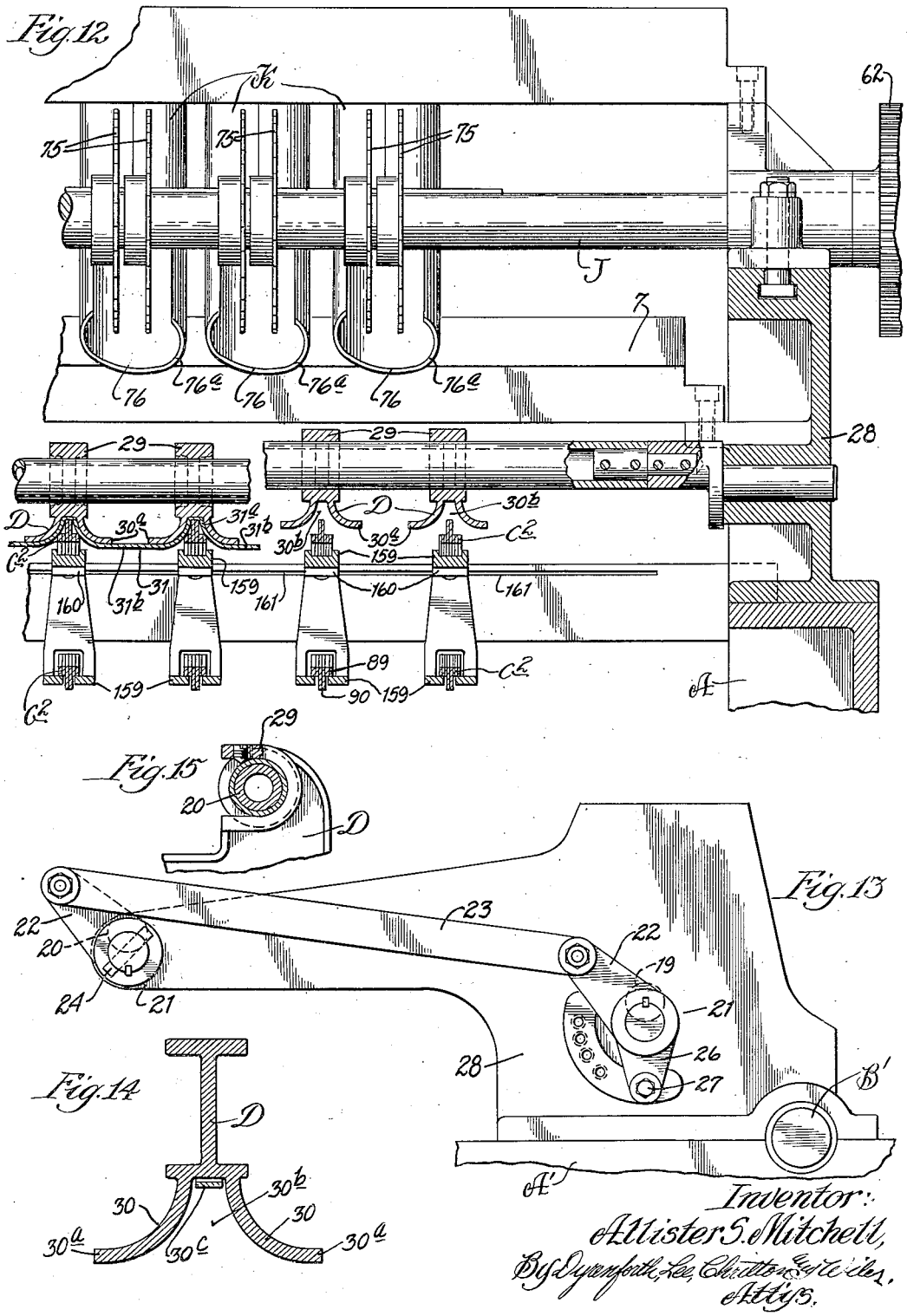

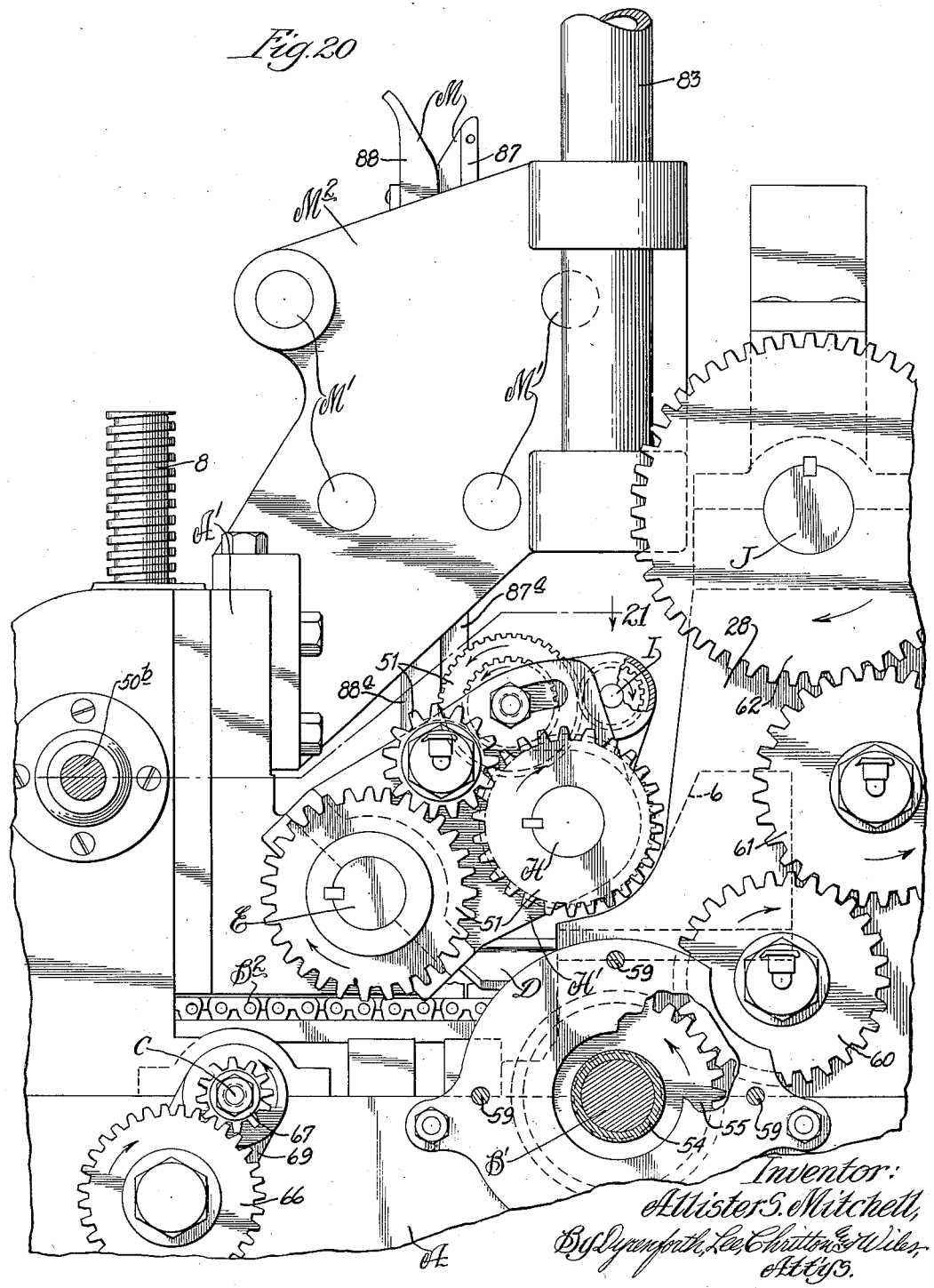

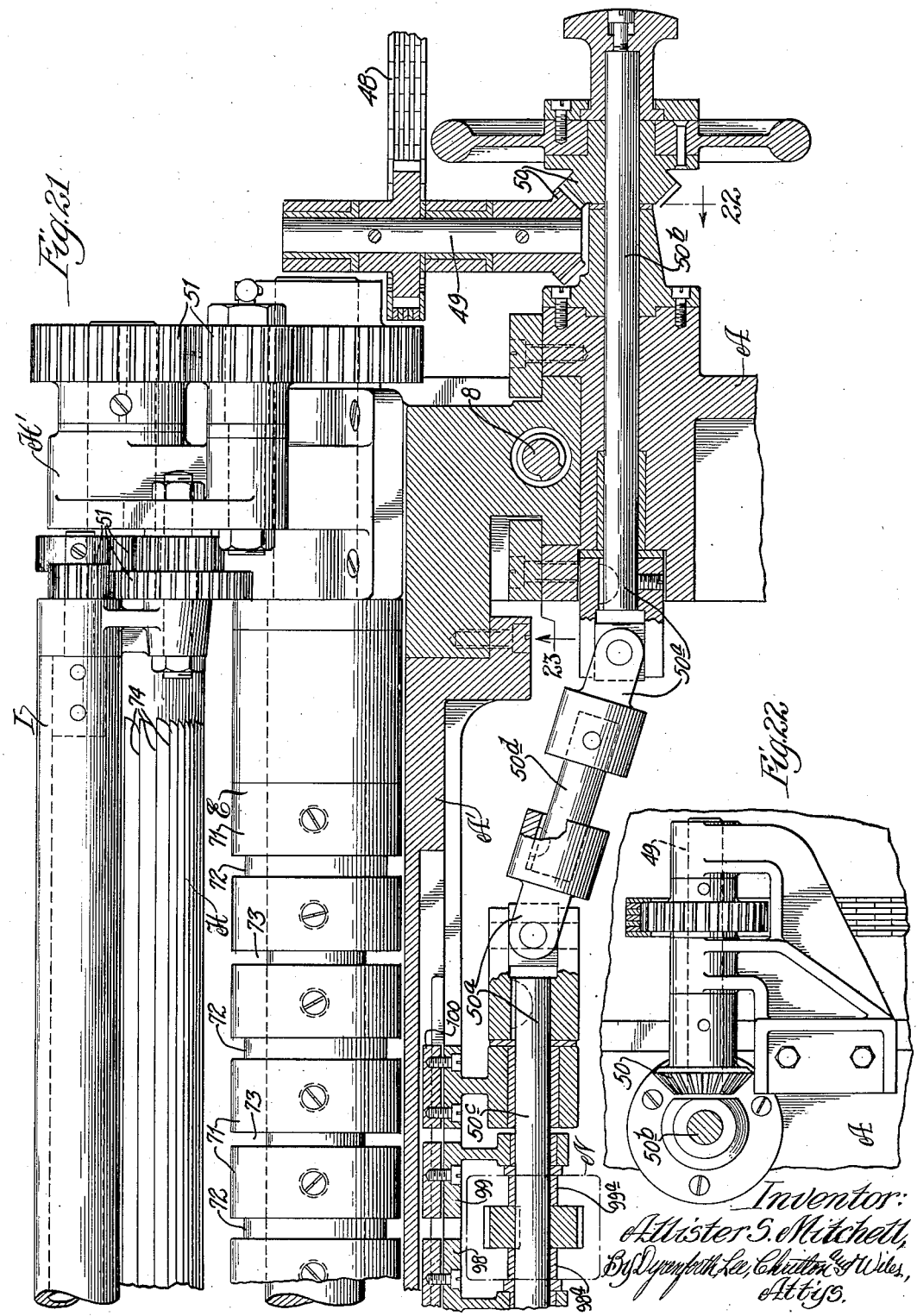

June 27, 1933. A. S. MITCHELL 1,915,329
UPHOLSTERY MAKING MACHINE
Filed March 18, 1929 16 Sheets-Sheet 11
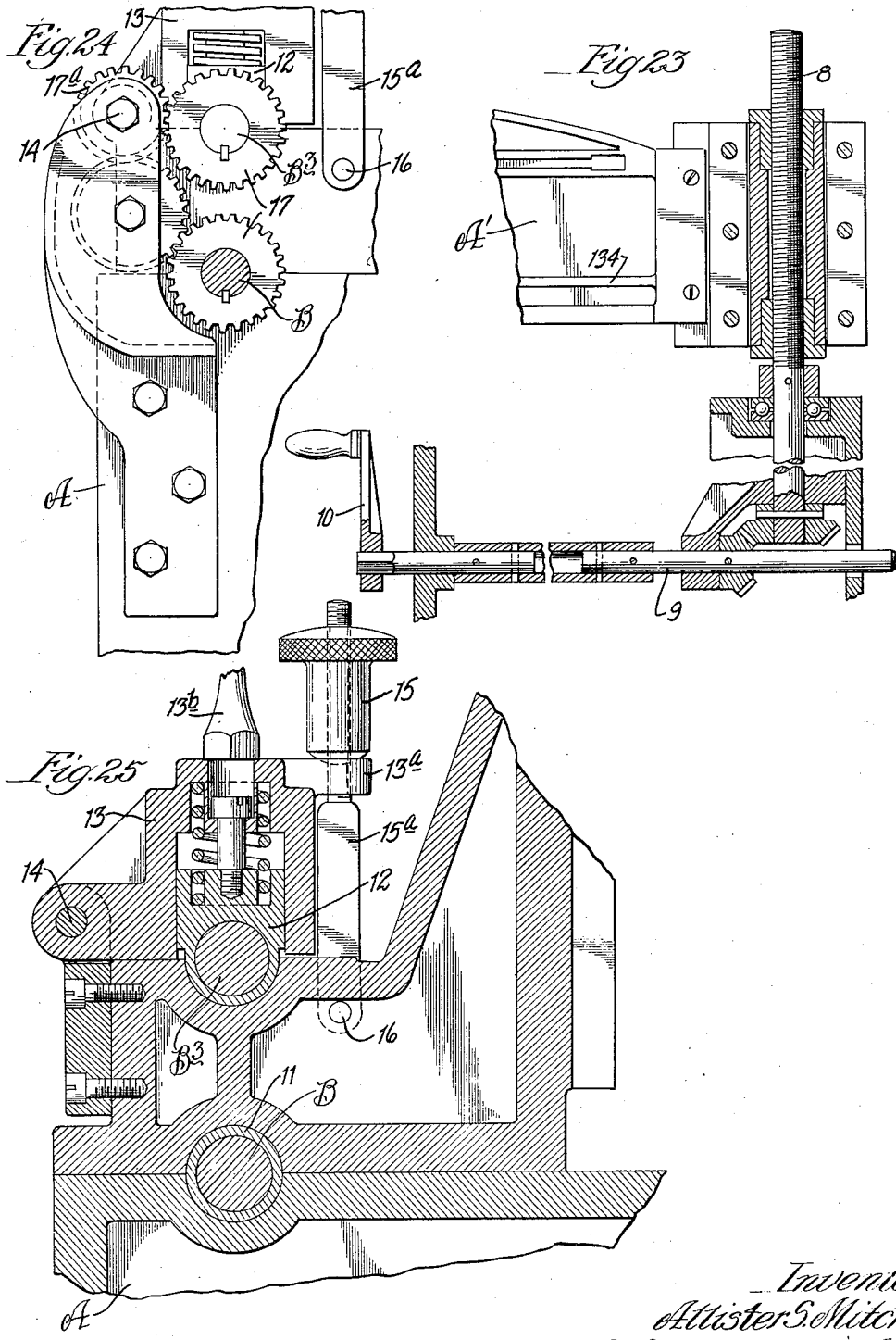

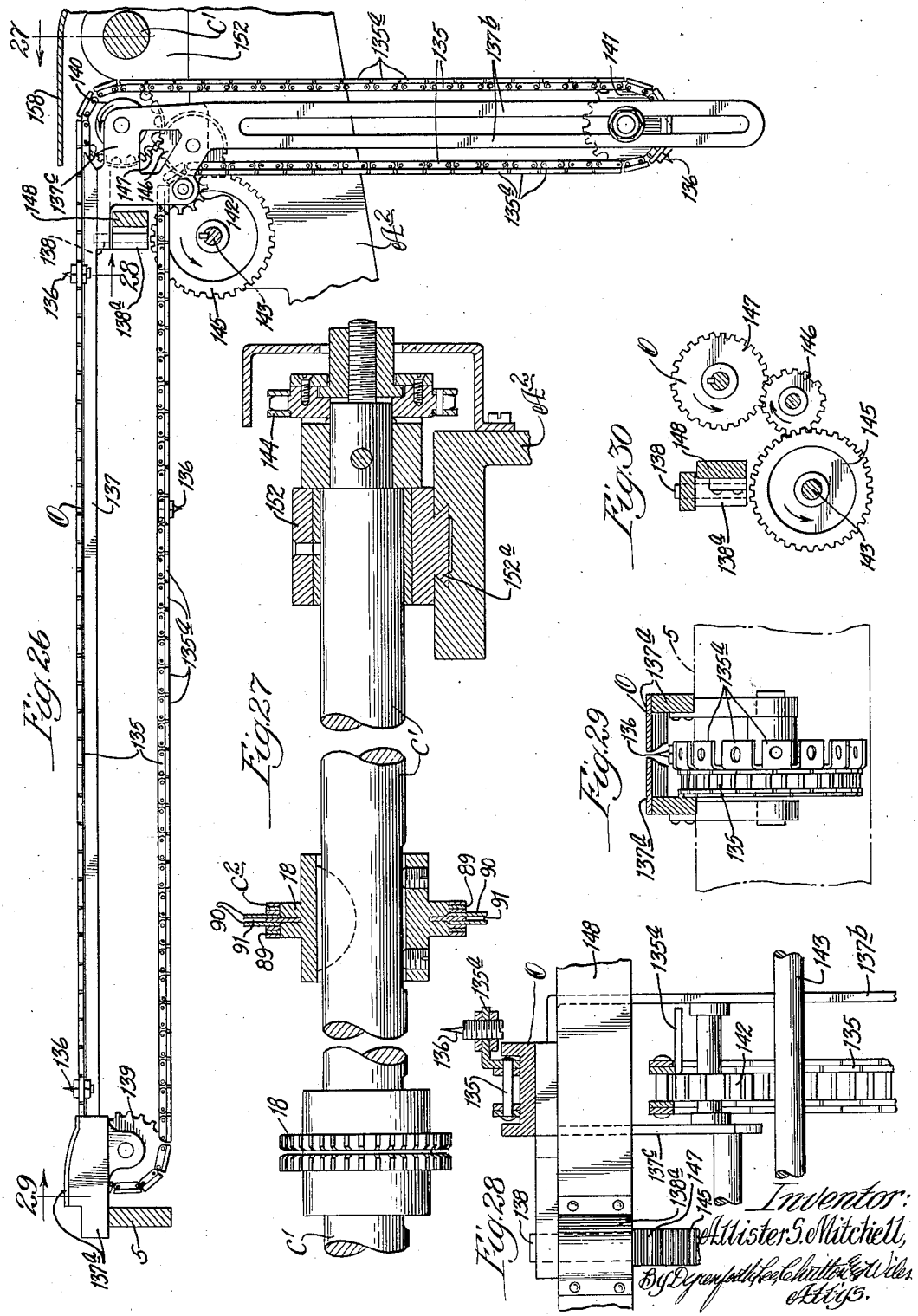

June 27, 1933.  A. S. MITCHELL  1,915,329
UPHOLSTERY MAKING MACHINE
Filed March 18, 1929   16 Sheets-Sheet 13
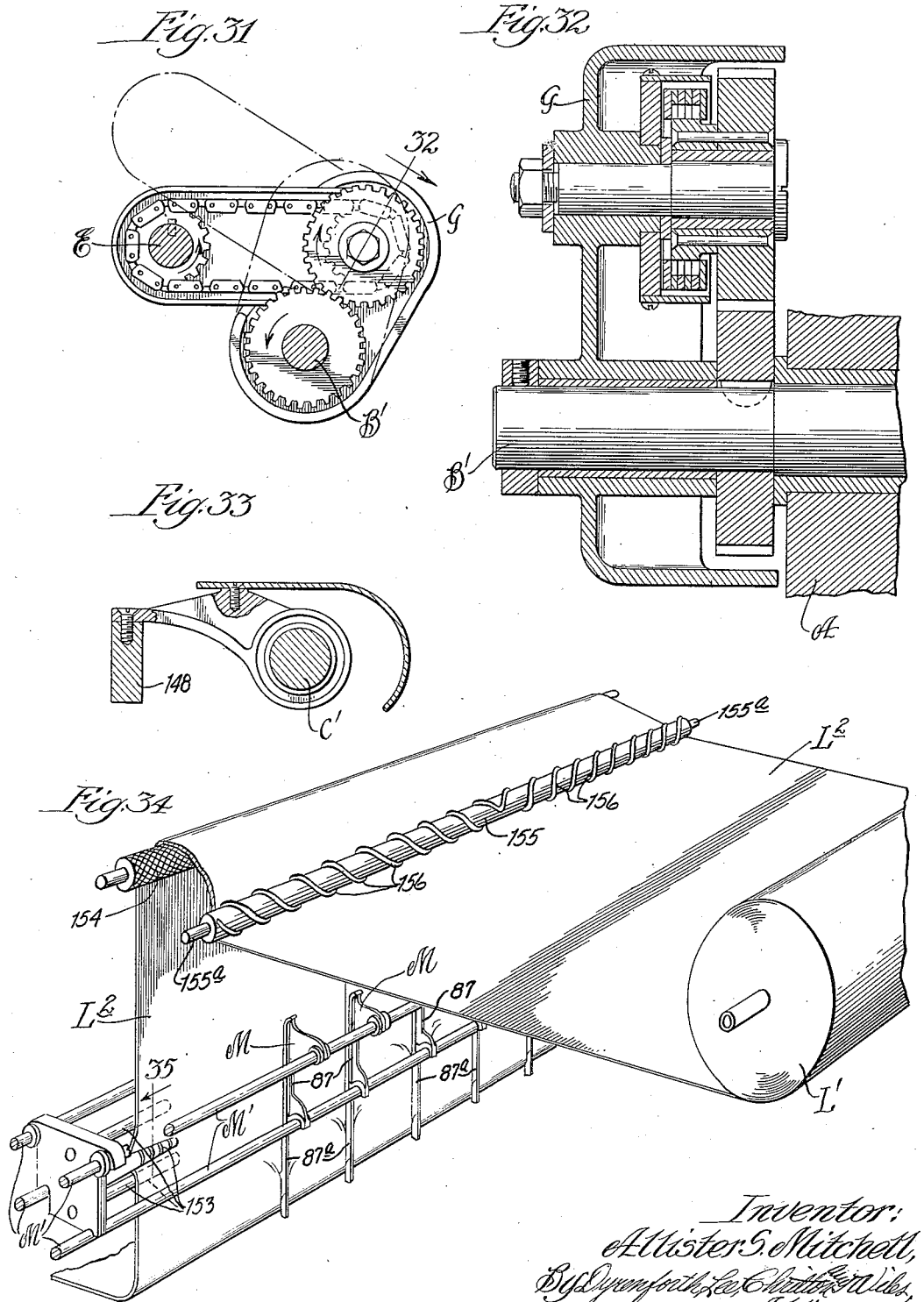

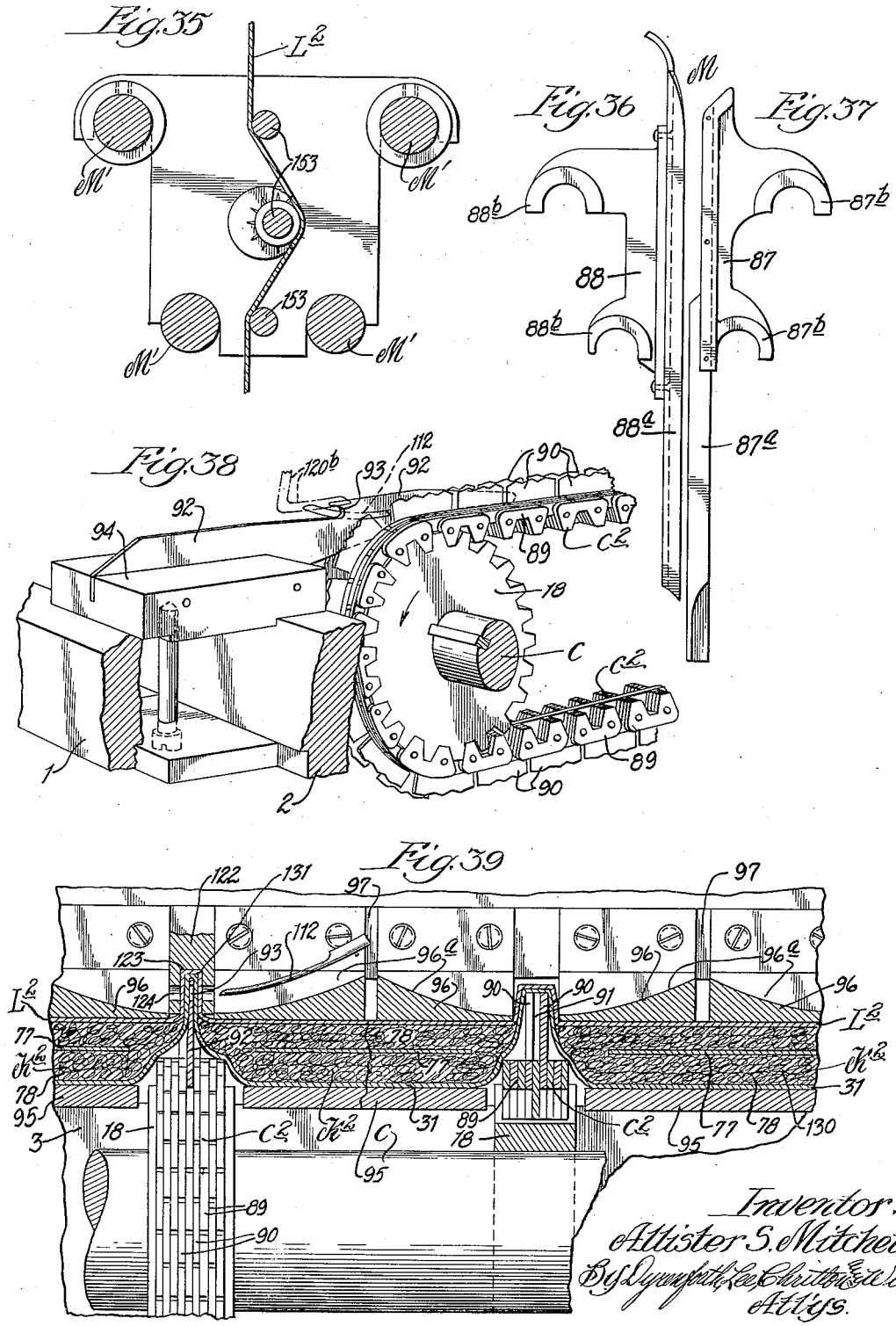

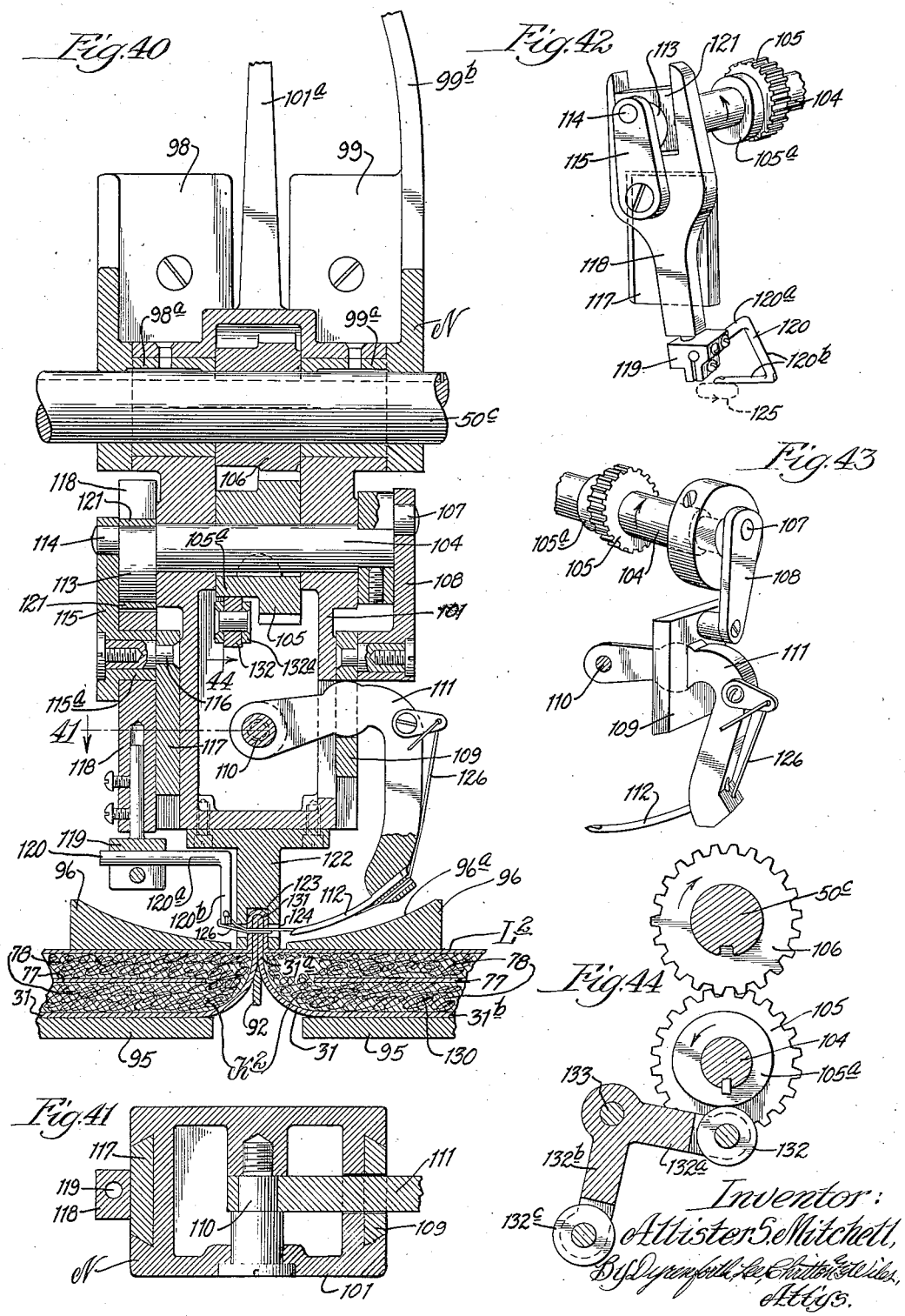

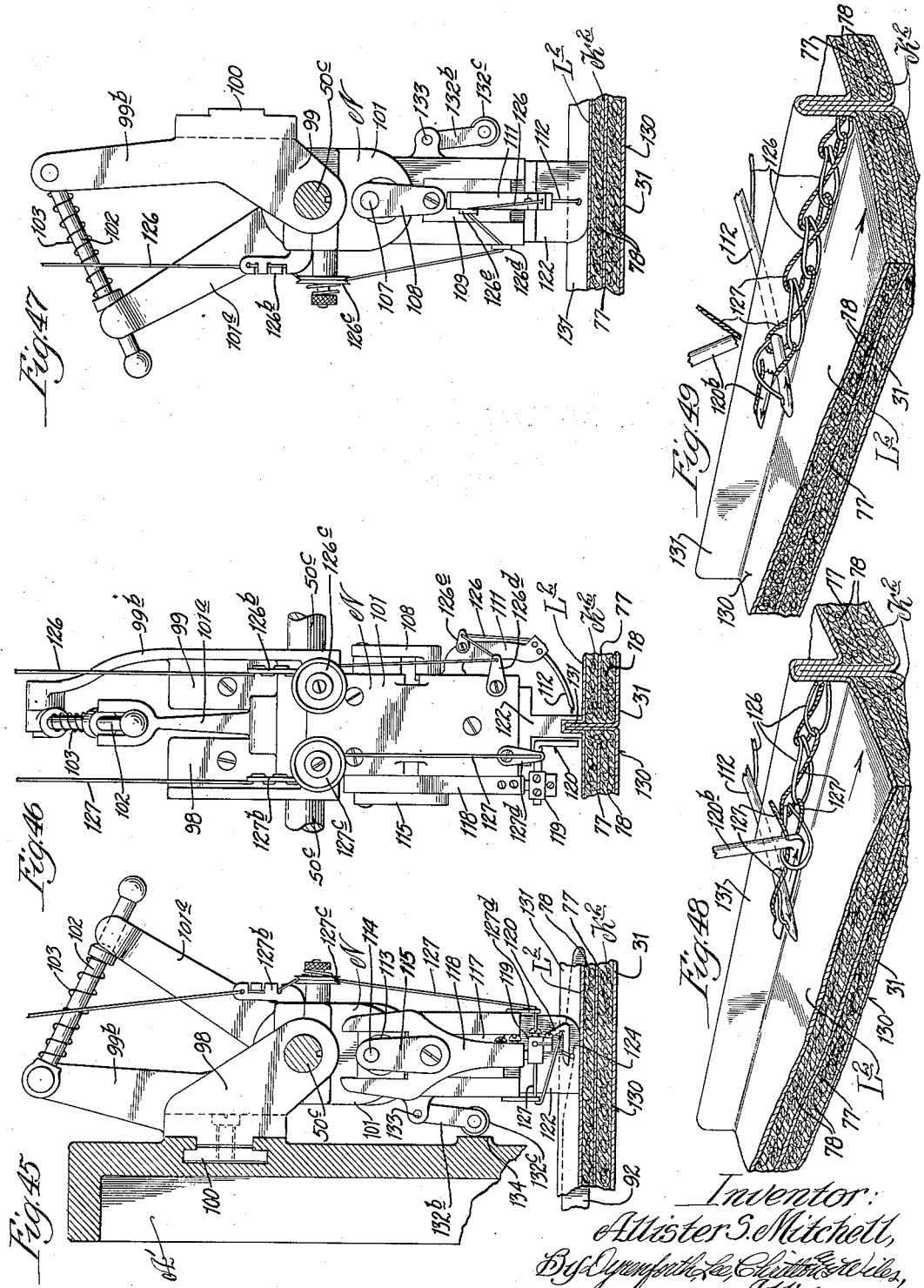

Patented June 27, 1933

1,915,329

UNITED STATES PATENT OFFICE

ALLISTER S. MITCHELL, OF DETROIT, MICHIGAN, ASSIGNOR TO NATIONAL AUTOMOTIVE FIBRES, INC., OF OAKLAND, CALIFORNIA, A CORPORATION OF DELAWARE

UPHOLSTERY-MAKING MACHINE

Application filed March 18, 1929. Serial No. 347,935.

This invention relates particularly to a machine for manufacturing stuffed, pleated upholstery. Such a machine is adapted, for example, to the manufacture of automobile seat-cushions, back-cushions, etc.

The primary object is to provide an improved machine which is capable of producing a large output of pleated upholstery.

In the use of the improved machine as preferably constructed, a cover-fabric, a lining-fabric, and strips of batting are fed through the machine, the cover-fabric being the lower fabric in the upholstery-forming operation; the lining-fabric has formed therein upstanding seam-ridges; the cover-fabric has formed therein upstanding seam-ridges and intervening depressed pleats, or pipes, the seam-ridges of the cover-fabric becoming nested within the seam-ridges of the lining-fabric; the strips of cotton batting, or the like, are drawn through with the fabrics and fill the pipes; and the upstanding, nested seam-ridges of the lining-fabric and cover-fabric are sewed by means of sewing mechanisms mounted on a cross-beam above the path of the materials, each sewing mechanism preferably comprising a head carrying a sewing-needle and a looper-needle, the head traveling with the continuously fed work while the sewing-needle is in engagement with the fabrics and then dropping back to the initial position to begin a new stitch.

The work is fed continuously through the machine. The lining is a continuous fabric; the cotton batts are continuous strips; and the cover-fabric may be either a continuous fabric or pre-cut covers. In either case, a continuous piece of pleated upholstery may be produced which may be cut into suitable lengths for use in upholstering seats, backs, or the like.

Provision is made for breaking or severing the batting strips at suitable intervals corresponding with the spaces between cushions. That is, the feed of the batting strips is periodically arrested and the strips broken or severed, so that the strips will not extend across the spaces between cushions.

The sewing mechanisms and certain other mechanisms which are disposed above the path of the work preferably are mounted on a vertically adjustable cross-head. This cross-head is equipped with pairs of lining-creasing members and with a forming-roll provided with circumferential grooves adapted to accommodate the seam-ridges; and the bed of the machine is equipped with endless ridge-chains upon which the cover-fabric is carried through the machine, the front portions of these ridge-chains working through the grooves of the forming-roll. The seam-ridges of the fabrics are brought into nested relation when the materials pass between the ridge-chains and the forming roll. Also, a series of pleat-forming members are disposed over the bed of the machine, these members serving to gather the cover-fabric and in conjunction with the ridge-chains to pre-form the seam-ridges and intervening pleats of the cover-fabric. Suitable tensioning devices are employed for yieldingly holding the fabrics in transversely stretched condition. These devices permit the materials to be gathered properly, however, to enable the seam-ridges of both fabrics and the pleats of the cover-fabric to be formed.

The invention is illustrated in a preferred embodiment in the accompanying drawings, in which—

Fig. 1 is a broken side elevational view of an upholstery-making machine embodying the invention; Fig. 1ª, a broken perspective view of the clutch-controlling mechanism which controls the starting and stopping of the machine; Fig. 1ᵇ, a broken plan view illustrating the manner in which a series of cushions is formed, using a continuous lining and a series of pre-cut covers; Fig. 2, a broken side elevational view of a rack loaded with rolls of cotton batts; Fig. 3, a section taken as indicated at line 3 of Fig. 2; Fig. 4, a broken section taken as indicated at line 4 of Fig. 1; Fig. 5, a broken sectional view taken as indicated at line 5 of Fig. 3; Fig. 6, a broken front elevational view of the machine; Fig. 7, a broken plan sectional view taken as indicated at line 7 of Fig. 6; Fig. 8, a broken vertical sectional view taken as indicated at line 8 of Fig. 6; Fig. 9, a broken sectional view taken as indicated at line 9 of Fig. 8, this view illustrating the manner in which the seam-ridges of the lining are formed; Fig. 10, a broken horizontal section taken as indicated at line 10 of Fig. 8, illustrating the manner in which the seam-ridge of the lining is fed to the forming-roll; Fig. 11, a broken plan section taken as indicated at line 11 of Fig. 8, this view showing a plan of the pleat-formers which co-operate with the ridge-chains with which the bed of the machine is equipped; Fig. 12, a broken vertical section taken as indicated at line 12 of Fig. 8, some of the pleat-forming devices being shown in the pleat-forming position and some of them being shown in the raised position, merely for purpose of illustration; Fig. 13, a fragmentary view illustrating a device for raising and lowering the pleat-formers which co-act with the ridge-chains; Figs. 14 and 15, detailed sectional views taken as indicated at the corresponding lines on Fig. 11 and showing details of the pleat-formers; Fig. 16, a perspective view, diagrammatic in its nature, illustrating gearing of the machine; Fig. 17, a broken side elevational view showing a portion of the gearing which appears in Fig. 1; Fig. 17ª, a broken section taken as indicated at line 17ª of Fig. 17; Fig. 18, a broken section taken as indicated at line 18 of Fig. 17; Fig. 19, a fragmentary view showing a detail of the cam which appears in Fig. 17 and which controls the stoppage of the batt-breaking means illustrated in Fig. 8; Fig. 20, a broken elevational view, showing portions of the gearing; Fig. 21, a broken plan sectional view taken as indicated at line 21 of Fig. 20; Fig. 22, a broken vertical section taken as indicated at line 22 of Fig. 21; Fig. 23, a broken transverse vertical section taken as indicated at line 23 of Fig. 21, the view illustrating the means for raising and lowering the cross-head of the machine; Fig. 24, a broken sectional view taken as indicated at line 24 of Fig. 7 and illustrating the manner in which the feed-rolls at the front end of the machine are geared together; Fig. 25, a broken vertical sectional view taken as indicated at line 25 of Fig. 6, this view illustrating the manner in which the feed-rolls are mounted; Fig. 26, a broken longitudinal vertical sectional view taken as indicated at line 26 of Fig. 7 and illustrating one of a pair of lateral tensioning devices employed for controlling the feed of a pre-cut cover-fabric, these devices permitting the gradual gathering of the cover as it is fed through the machine; Fig. 27, a broken transverse vertical section taken as indicated at line 27 on Figs. 11 and 26, this view illustrating the rear sprocket-shaft upon which the ridge-chains are mounted; Fig. 28, a broken transverse vertical section taken as indicated at line 28 of Fig. 26; Fig. 29, a broken transverse vertical section taken as indicated at line 29 of Fig. 26; Fig. 30, a fragmentary vertical sectional view taken as indicated at line 30 of Fig. 11; Fig. 31, a section taken as indicated at line 31 of Fig. 11 and illustrating the manner in which the forming-roll is driven from a shaft in the bed of the machine, regardless of the position of the cross-head which carries the forming-roll; Fig. 32, an enlarged sectional view taken as indicated at line 32 of Fig. 31; Fig. 33, a detailed sectional view at the rear portion of the machine, taken as indicated at line 33 of Fig. 11; Fig. 34, a perspective view illustrating the manner in which the lining-fabric is fed to the formers which form the seam-ridges; Fig. 35, a sectional detailed view taken as indicated at line 35 of Fig. 34; Figs. 36 and 37, elevational views of a pair of ridge-forming members which operate upon the lining; Fig. 38, a broken sectional perspective view showing the relation of a ridge-heightening blade, or fin, which cooperates with the front end of the ridge-chain, the nested seam-ridges of the fabrics being drawn over this member during the stitching operation; Fig. 39, a broken transverse vertical section taken as indicated at line 39 of Fig. 8; Fig. 40, a vertical sectional view of one of the sewing-mechanisms, taken as indicated at line 40 of Fig. 8; Fig. 41, a broken horizontal section taken as indicated at line 41 of Fig. 40; Fig. 42, a broken perspective view illustrating the manner in which the looper-needle of the sewing-mechanism is actuated; Fig. 43, a broken perspective view illustrating the manner in which the sewing-needle is actuated; Fig. 44, a detailed sectional view taken as indicated at line 44 of Fig. 40; Fig. 45, a sectional view illustrating the manner in which the sewing-mechanisms are adjustably mounted on the cross-head of the machine; Fig. 46, a front view of one of the sewing-mechanisms; Fig. 47, a view of the sewing-head from the side opposite that appearing in Fig. 45; and Figs. 48 and 49, views illustrating the co-operation of the sewing-needle and looper-needle in forming lock-stitches.

In the preferred embodiment illustrated, A designates the main frame of the machine which is equipped near its front end with a vertically movable cross-head A' and which also has a rearward extension A² which constitutes a portion of the bed of the machine; B, a lower feed-roll journalled in the front end of the frame and constituting the main drive-shaft of the machine; B', a companion shaft journalled in the frame some distance back of the roll B; B², a pair of chains connecting the shafts mentioned; B³, an upper feed-roll co-acting with the roll B; C and C' (Fig. 7), front and rear sprocket-shafts, respectively, upon which are mounted a series of narrow, relatively long fabric-ridging chains C², the shaft C being disposed about midway between the shafts B and B'; D (Figs. 11 and 12), a system of fabric-gathering devices co-acting with the ridge-chains C²; E (Figs. 8 and 11) a forming-roll journalled in the cross-head A' and vertically movable therewith; F (Figs. 7 and 16), a sprocket-chain connecting the roll B and the shaft C; G (Figs. 16, 31 and 32), gear means through the medium of which the forming-roll E is actuated from the continuously rotating shaft B'; H (Fig. 8), a continuously rotating batt-feeding roll journalled in brackets H' carried by the cross-head A'; I, a continuously rotating batt-deflecting roll journalled in the brackets H'; J, a batt-feeding roll journalled on members carried by the main frame, said roll being adapted to be periodically arrested to effect severance or breakage of the batts; K (Figs. 1-4 and Fig. 8), a series of tubular batt-guides which are supplied with batting-strips from a rack K' upon which are supported rolls of batts; L (Fig. 1), a support for a roll of lining material L'; M, series of pairs of lining-creasing members supported on shafts, or cross-bars M' which connect brackets M² carried by the cross-head A'; N, a series of sewing mechanisms mounted on the cross-head A'; and O, a pair of lateral feed devices mounted in the bed of the machine and adapted to serve in feeding pre-cut covers through the machine, these devices comprising yieldingly held longitudinally travelling chains adapted to permit the cover-fabric to be gathered by the gathering devices D and so formed by means of these devices, acting in conjunction with the ridge-chains, as to provide seam-ridges and intervening pleats.

The frame A may be of any suitable construction. In the illustration given, it comprises side-standards which are rigidly connected together by means of cross-members 1, 2, 3, 4 and 5. The side-standards are further connected above the plane of the bed by heavy cross-bars 6 and 7, as appears from Fig. 8.

As appears from Figs. 6 and 23, the cross-head A' is supported on a pair of screws 8 which are journalled in the side-standards of the frame A, these screws being geared together at their lower ends through the medium of a cross-shaft 9 adapted to be actuated by a crank 10. Thus, provision is made for vertical adjustment of the cross-head.

The feed-rolls B and B³ are mounted in the manner shown in Figs. 8, 24 and 25. The lower roll is journalled in fixed bearings 11 in the main frame; and the upper roll is journalled in spring-pressed bearings 12 mounted in frame-members 13 which are pivotally connected as indicated at 14. The members 13 are provided at their end-portions with slotted lugs 13ª which are engaged by nuts 15 mounted on the reduced threaded upper ends of rods, or links, 15ª which are pivotally connected with the main frame at 16.

The lower roll B is continuously driven in the manner to be presently described. The lower roll serves to actuate the upper roll through the medium of a gear-train 17, as illustrated in Fig. 24. One of the members 17ª of the gear-train is mounted on the pivot 14 of the frame-member 13. The arrangement is such that the upper roll can move without interfering with the driving thereof.

The chains B² serve to actuate the shaft B' and also to support the side-portions of the work drawn through the machine by means of the feed-rolls B and B³. The members 13 are equipped with rigidly secured handles 13ᵇ by means of which the members may be swung forwardly about the pivot 14, when desired.

The ridge-chains C² (Figs. 8, 11 and 27) are mounted on sprocket-wheels 18 which are adjustably mounted on the shafts C and C', as illustrated in Fig. 27. This permits adjustment of the spaces between the ridge-chains to enable cushions having pleats of different sizes to be formed. The rear sprocket-shaft C' is driven through the medium of the ridge-chains C².

The gathering devices D which co-operate with the ridge-chains to form the cover-fabric into seam-ridges and intervening pleats are mounted (Figs. 11-14) on a pair of eccentric shafts 19 and 20 having offset portions journalled in bearings. These shafts are equipped with arms 22 which are connected by means of links 23, so that the crank-shafts may be actuated together. One of the shafts is equipped with a pin 24 adapted be engaged by a crank 25 (see dotted lines, Fig. 11). Also, one of the shafts is equipped with an arm 26 having means 27 co-acting with a frame-member 28 for securing the crank-shafts in adjusted position.

The devices D are provided with U-shape bearings 29 which engage the crank-shafts. These bearings are adapted to permit the gathering devices, or formers, to be withdrawn from the crank-shafts.

As appears from Fig. 11, the devices D comprise a central pair of members whose rear ends engage the cover-fabric first, and additional members on each side whose rear ends are successively advanced with relation to the rear ends of the central members. The purpose is to enable the fabric to be formed first on the two central pairs of ridge-chains, and then in succession forwardly at each side of the center as the fabric is advanced through the machine. Each member D comprises a pair of outwardly flaring depending wings 30 having edge-portions 30ª. Between the wings is a space 30ᵇ adapted to accommodate the ridge-chain. Preferably, each member is provided with a leaf-spring 30ᶜ which is adapted to press the fabric against the upper portion of the ridge-chain. The cover-fabric is designated 31. As it is drawn between the formers D and the ridge-chains, the seam-ridges 31ª of the fabric are formed and also the intervening fulnesses, or pleat-portions, 31ᵇ are formed.

In Fig. 12, the forming position of the members D is illustrated at the lower left-hand portion of the figure, while the lower right-hand portion of the figure shows the forming-members in the lifted position.

In the illustration given, the various mechanisms are actuated by means of an electric motor P which is connected through the medium of a belt 32 with a clutch device 33 mounted on a shaft 34 (Figs. 1 and 16). The shaft 34 is equipped with a worm 35 which actuates a worm-wheel 36 on the main shaft B of the machine, which is the shaft of the lower feed-roll.

The clutch 33 is controlled by a bell-crank lever 37ª which has an arm 37ª (Figs. 1 and 1ª) which is connected by rods 38 and 39 with arms 38ª and 39ª, respectively. The arm 38ª is fixedly mounted on a rock-shaft 40 from which extends forwardly an arm 41 equipped with a front treadle 41ª. The arm 39ª is rigidly mounted on a tubular member 42 journalled on the shaft 40 which is equipped with a rearwardly extending arm 42ª having its rear end provided with a treadle 42ᵇ.

In the position of the clutch shown in Fig. 1, the clutch is in gear. The clutch may be disconnected by depressing the arm 37ª through the medium of either the rod 38 or the rod 39. Either one of the treadles may be used to release the clutch.

The forwardly extending arm 41 has secured thereto a spring strip 43 which is connected to the short arm of a bell-crank lever 44 which is connected by means of a pivot 45 with the arm 41. The member 44 is equipped with a cam-stud 46 which engages a cam-groove 47 which is provided in a plate 47ª which is rigidly secured to the main frame. The cam-groove 47 is provided at its lower portion with an upwardly directed recess 47ᵇ.

When either one of the treadles is depressed, the stud 46 moves downwardly through the cam-slot and finally enters the recess 47ᵇ and thus locks the main clutch in the released position. The machine may be started by means of the front treadle, but not by means of the rear treadle. When the front treadle is depressed to start the machine, the stud 46 is caused to clear the recess 47ᵇ, and thereafter the cam-stud may move upwardly through the right-hand portion of the cam-groove shown in Fig. 1ª to a position which permits engagement of the clutch. Such position is shown in Figs. 1 and 1ª.

The worm-shaft 34 is connected by means of a sprocket-chain 48 with a shaft 49 which is connected by means of gears 50 with the shaft 50ª which serves to actuate the sewing mechanisms. The manner of effecting the drive of the shaft 50ª will be understood from Figs. 16 and 21. The shaft 50ª has a portion 50ᵇ journalled in the main frame; a main portion 50ᶜ journalled in bearings carried by the cross-head A'; and an intervening extensible portion 50ᵈ having universal connections with the other portions so that the shaft 50ᵉ may be actuated regardless of the position of the cross-head.

The forming roll E serves to actuate the rolls H, I, these shafts being connected by a gear-train 51, as appears from Figs. 1 and 16.

As has been stated, the shaft B' rotates continuously, being driven from the shaft B by the chains B². One end of the shaft B' (Figs. 1, 16–18) is equipped with a clutch member 52 which normally is engaged by a sliding clutch member 53 mounted on the hub 54 of a gear 55, a spring 56 serving normally to hold the clutch members in engagement. The clutch may be shifted to the non-engaging position shown in Fig. 18 by means of a lever 57, thus bringing a conical portion 53ª into engagement with a brake device 58 which is secured to the main frame by means of bolts 59.

Motion is communicated from the gear 55 through gears 60, 61 and 62 to the breaker-shaft J.

The clutch-shifting lever 57 is automatically actuated to control the stoppage of the breaker-shaft J. This is accomplished through the medium of the rotating cam device 63 journalled on the stub shaft 64 which is carried by the main frame. The cam device 63 is actuated by a gear 65 driven by an idler 66 which is actuated by a gear 67 on the shaft C. The hub portion of the cam-device 63 is journalled on the shaft 64 and is equipped with lugs 63ª which engage suitable recesses in the hub portion of the gear 65.

The device 63 comprises a pair of angularly adjustable cam members 63ᵇ and 63ᶜ, presenting cam surfaces 63ᵈ and 63ᵉ which are adapted to be engaged by a roller 68 with which the lever 57 is equipped. When the cam passes beneath roller 68, the clutch member 53 is shifted to the non-clutching position shown in Fig. 18, thus stopping the rotation of the gear 55 and applying a braking action to it. This, in turn, arrests the rotation of the breaker-shaft J and holds it for an interval corresponding to the spaces between cushions. This interval may be adjusted by adjusting the cam members 63ᵇ and 63ᶜ with relation to each other.

The idler 66 is carried by an arm 69 pivoted on the shaft C and having adjustable connections 70 with the main frame. The length of the period between stoppages of the breaker-roll J may be changed by changing the ratio of the gears 65 and 67 shown in Fig. 17, the adjustability of the arm 69 permitting, for example, a gear of different diameter to be substituted for the gear 65.

As appears from Figs. 11 and 21, the forming-roll E comprises a shaft equipped with adjustable collars 71 which can be so adjusted as to provide seam-accommodating grooves 72 so spaced with relation to each other as to correspond with the desired width of the pleat. Between the members of each pair of collars 71 is a space 73 which permits the effective space between the seam-accommodating grooves 72 to be varied.

As appears from Fig. 8, the batt-feeding roll H is provided with teeth, or corrugations, 74 which are sloped in a direction to effectively engage the cotton batts in the feeding operation.

The batt-deflecting roll I rotates clockwise, as shown in Fig. 8, the purpose of this roll being to deflect or guide the ends of the batts, after breakage, downwardly and within the grip of the batt-feeding roll H, the latter roll co-acting with a concave $6^a$ with which the cross-member 6 of the frame is provided.

As will be understood from Figs. 8 and 16, the break-roll J comprises a shaft and toothed disks 75 adjustably secured on said shaft, it being understood that only a few of the toothed disks are shown in Fig. 16. The teeth of these disks slope in a direction opposite the direction of rotation, so that when the breaker-shaft J is stopped and held by the brake-device shown in Fig. 18, the teeth will effectively engage the cotton batts and hold them at this point, while the rotation of the feed-roll H continues.

The tubular members K, as will be understood from Figs. 8 and 12, are provided with obliquely cut extremities 76, which afford shearing edges. In Fig. 8, the longer portion of the tube indicated at $76^a$ is shown in dotted lines, having been removed from the figure.

The batts are designated $K^2$, these batts being drawn from rolls $K^3$ mounted on the rack K'. As appears from Figs. 4 and 40, preferably each batt comprises a strip of paper 77 enclosed in cotton batting 78. Thus, the means for shearing the batts when the rotation of the breaker-roll is arrested is desirable.

The rack K' is supported at its front end on standards 79 and at its rear end on rollers 80, as will be understood from Figs. 1 and 2. Each inclined member of the rack may support a number of cotton batt rolls, as appears from Fig. 2; and the batts $K^2$ pass from the rolls to suitable guides 81 mounted on the rack.

The front standards of the rack are connected by extensible connecting rods 82 with standards 83 supported upon the vertically adjustable cross-head A'. A roller 84 is supported between the standards 79 and additional rollers 85 are supported between the extensible connecting rods 82. The cotton batts pass over these rollers in the passage of the batts to the tubular members K.

The support L for the lining material roll L' comprises a pair of small rollers 86 suitably mounted on the upper end of the standards 79. The sheet of lining material passing to the machine is designated $L^2$.

The series of pairs of lining-creasing members M, as will be understood from Fig. 6, Figs. 8–10, and Figs. 36 and 37 are adapted to gather and crease the lining, first at the central portion thereof, and then in succession at each side of the central portion as the lining comes into engagement with the successive pairs of formers, or creasers.

Each pair comprises a member 87 having a groove-producing flange $87^a$; and a member 88 having a groove $88^a$ adapted to accommodate the flange $87^a$. The upper ends of the tongues $87^a$ of the two central pairs of formers are highest and so engage the lining first; and the upper ends of the tongues of the successive members 87 are successively lower, passing from the center to either side of the machine. The stepped relation of the upper ends of the tongues $87^a$ is sufficiently indicated by dotted lines in Fig. 6. See, also, Fig. 34.

Each of the members 87 is equipped with hooks, or bearings, $87^b$; and each of the members 88 is equipped with hooks, or bearings, $88^b$. These hooks engage the cross-bars M', as shown in Fig. 8, the male member $87^a$ then projecting into the groove $88^a$, as shown in Figs. 8 and 9.

The lower extremity of each flange, or tongue, $87^a$ registers with a seam-accommodating groove 72 of the forming-roll E, as will be understood from Figs. 8 and 10. Thus, the ridges formed in the lining $L^2$ as the lining passes vertically downwardly between the pairs of formers are guided into the seam-accommodating grooves of the roll E; and it may be remarked here that the ridge-chains $C^2$ bring the ridges of the cover-fabric into nested relation with the ridges of the lining-fabric immediately beneath the roll E.

Referring to Figs. 8, 38 and 39, it may be stated that each ridge-chain $C^2$ comprises suitably connected low links 89 and intermediate high links 90, the intermediate high links being separated by a space 91, as appears from Fig. 39.

The nested seam-ridges of the lining fabric and cover fabric pass from the front end of the ridge-chain over a thin blade 92 which serves as a ridge-heightener. The front end of the blade 92 extends rearwardly and enters the space 91 between the high links of the ridge-chain. The upper edge portion of the member 92 is recessed and undercut, as indicated at 93, the recess serving to permit passage of the sewing-needle through the nested ridges of the seam.

It will be understood that there is a member 92 corresponding with each ridge-chain. Each member 92 is mounted on a laterally adjustable block 94 carried by the cross bars 1 and 2 of the main frame. Thus, the members 92 may be adjusted laterally to proper position, depending upon the width of the pleat or the distance between seams.

In the spaces between the ridge-chains are suitably supported strips, or shoes, 95 over which the pleated portions of the cushion are drawn. Above the cushion, the cross head A′ is equipped with laterally adjustable shoes 96 which are recessed or made concave on their upper surfaces, as indicated at $96^a$. Between each pair of shoes is a space 97 which registers with the seam-accommodating groove 72 of the forming-roll E.

The construction and operation of the sewing mechanism N will be understood by reference to Figs. 6, 8 and 39–49. Each head is suspended on a pair of brackets 98 and 99, these brackets being adjustably connected, as indicated at 100, with a groove in the front face of the cross head A′. The brackets are provided, respectively, with bearings $98^a$ and $99^a$ upon which is journalled the frame or head 101 of the sewing mechanism. The bracket 99 is equipped with an upwardly extending arm $99^b$ with which is pivotally connected a rod 102 equipped with a compression spring 103 whose front end bears against an arm $101^a$ which is formed integrally with the head 101. The spring tends to hold the sewing mechanism in the retracted position shown in Figs. 8 and 45.

The shaft $50^c$, which actuates the sewing mechanisms, is journalled in the bearings $98^a$ and $99^a$ of the brackets carried by the cross head of the machine. The sewing head is adapted to swing on the bearings $98^a$ and $99^a$ so that the lower end of the sewing head travels forwardly with the work while the sewing needle is in engagement with the seam, and the sewing head then drops back to its initial position to begin a new stitch.

The head 101 depends from the shaft $50^c$ and journalled in the head is a shaft 104 which is parallel with the shaft $50^c$ and connected therewith by means of gears 105 and 106. A cam $105^a$ is integral with the gear 105. The shaft 104 is equipped at one end with a crank 107 which actuates a link 108 which, in turn, actuates a slide 109 connected with one side of the head 101.

The head 101 is hollow and is equipped with a pivot 110 upon which is pivoted the inner end of the sewing-needle actuating bent lever 111, this lever carrying the curved sewing-needle 112.

The other end of the shaft 104 is equipped with a cam 113 and a crank 114. From the crank 114 depends a link 115 which is equipped at its lower end with an inwardly extending tubular pivot $115^a$ which is connected, by means of a stud 116, with the upper end of a slide 117 mounted on the side of the head 101. Upon the pivot $115^a$ is pivoted a looper-needle actuating lever 118 which is equipped with an adjustable holder 119 which carries the looper-needle 120. The upper end of the lever 118 is bifurcated and engages a block 121 which is journalled on the eccentric 113.

The lower end of the head 101 is equipped with a shoe 122 which is provided with a seam-accommodating slot 123 and with a transverse perforation 124 through which the sewing-needle works.

The looper-needle is provided with a shank $120^a$ which extends inwardly from the holder 119, and has an elbow-shaped member $120^b$ which is adapted to swing in a plane parallel with the seam. The shaft 104 serves both to raise and lower the lever 118 and, also, to swing it on the pivot at $115^a$. The point of the looper-needle describes an ellipse which has a long horizontal axis and a short vertical axis, this ellipse being indicated by dotted lines at 125 in Fig. 42. The shaft 104 serves also to oscillate the lever 111 and thus actuate the sewing-needle which is adapted to be thrust transversely through the nested seam-ridges of the lining fabric $L^2$ and the cover fabric 31. The nested seam-ridges of the two fabrics are shown clearly in Figs. 40 and 48.

The sewing-thread is designated 126, and the looper-thread is designated 127. As appears from Fig. 1, these threads are drawn from spools $126^a$ and $127^a$ mounted upon a supporting device 128 carried by the standards 83 which rise from the cross head of the machine. The threads pass upwardly and about suitable guides carried by a member 129 mounted on the upper end of the standards 83, and thence downwardly and through suitable guides to the guides and tensioning devices mounted on the head of the sewing mechanism. Thus, the sewing-thread 126 (see Fig. 46) passes through a suitable tensioning device $126^b$ and about a member $126^c$, thence through a guide $126^d$ at the lower end of the sewing head, thence through a guide $126^e$ carried by the lever 111, and finally through the sewing-needle; and the looper-thread 127 passes through a tensioning device $127^b$, thence about a member $127^c$, thence through a guide $127^d$ at the lower end of the head, and finally through the guides of the looper-needle 120.

The manner in which the loops formed by the two needles are brought into interlocking relation is sufficiently indicated in Figs. 48 and 49. The sewing-thread 126 is shown in light lines, and the looper-thread 127 is shown in heavy shaded lines. The cushion, as a whole, is designated 130, and the nested seam-ridges of the two fabrics are designated, as a whole, 131. The sewing-needle travels with the work while the sewing stitch is being effected; and the sewing head then drops back to the initial position to begin a new stitch. The point of the looper-needle is directed rearwardly and passes above the sewing-needle in the operation of carrying the looper-thread loop through the sewing-thread loop. The looper-needle is lowered at the beginning of its return stroke and the sewing-needle passes above the looper-needle in carrying the sewing-thread loop through the looper-thread loop.

The forward swinging of the head 101 is effected by means of the cam $105^a$ which engages a roller 132 mounted on one end of a bell crank lever $132^a$ which is pivotally supported on the head, as indicated at 133. The other arm $132^b$ of the bell crank lever is equipped with a cam roller $132^c$ which engages a cam surface 134 with which the cross head A' is provided. The cam $105^a$ is timed to depress the roller 132 at the proper time to cause the head to swing forwardly during the working stroke of the sewing-needle. The spring 103 returns the head to the initial position.

The devices O which yieldingly hold the lateral edges of the cover-fabric 31 are illustrated in Figs. 7, 11 and 26–30. These devices are mounted in the bed of the machine near the sides of the frame. Each device comprises an endless chain 135, the links of which are equipped with perforate sheet-metal members $135^a$ which are in the form of small angle plates provided with perforations: pointed studs, or pins, 136 connected with the members $135^a$ at suitable intervals, corresponding pins of the two chains being in transverse alignment, as will be understood from Fig. 7; a swinging-track, or chain-support, 137, the member 137 being mounted on a pivot 138 near the rear end of the machine and being equipped at its front end with a slidable support $137^a$ which serves also as a stripper, resting on the cross-member 5 of the main frame and the member 137 being equipped at its rear end with a depending extension $137^b$; a sprocket-wheel 139 journalled in the member $137^a$; a sprocket-wheel 140 disposed some distance back of the pivot 138; a sprocket-wheel 141 adjustably connected with the downward extension $137^b$; and a sprocket-wheel 142 which supports the lower portion of the chain at the point where the chain forms an angle, as illustrated in Fig. 26.

The sprocket-chains 135 are driven through the medium of a transverse shaft 143 which is connected at one end by a sprocket-chain 144 with the rear sprocket-shaft C' which carries the ridge-chains. The shaft 143 is equipped (for each device) with a gear 145 which drives a gear 146; and the gear 146 meshes with a gear 147 which is integral with the sprocket-wheel 140. Both of the gears 146 and 147 are mounted on a member $137^c$ which constitutes a portion of the track 137. The track can swing on the pivot 138 while the gear 146 remains in mesh with the gear 145. As appears from Figs. 26 and 30, the pivot 138 is carried by a clip $138^a$ which is secured to a cross-member 148 of the main frame. Thus, the chain 137 may swing from the position shown in Fig. 7 to the position shown in Fig. 11 without interfering with the drive.

The slide $137^a$ is connected, by means of a tension-spring 149, with a member 150 which is formed integrally with the end-portion of the cross-bar 5.

The bearings for the shaft C' are designated 152. These bearings have adjustable connections $152^a$ with the main frame, thus enabling the ridge-chains to be properly stretched.

The lateral edge-portions of the lining-fabric $L^2$ are engaged by devices 153 which properly hold the lining-fabric but permit it to be gathered in by the former M as the fabric passes through the machine.

As shown in Fig. 34, the lining-fabric $L^2$ passes over a roller 154 and is engaged by a roller 155 which is interposed between the roll L' and the roller 154. The roller 155 is provided with reverse spirals 156 extending from the central portion of the roller towards the ends thereof. The shaft 155 is provided with a reduced extension $155^a$ which ordinarily will be held in a suitable friction-bearing. The spirals 156 extend in the proper direction to iron the lining-fabric, or cause it to be stretched laterally, so that it will pass, in smooth condition, into the devices 153 and the formers M, as will be understood from Fig. 34.

The operation of the machine may be described briefly:

The materials are drawn through the machine by the rolls B and $B^3$ at the front end of the machine; the cover-fabric 31 is initially fed into the machine through the medium of the ridge-chains $C^2$ and the feed and tensioning-chains 135; the formers D, in conjunction with the ridge-chains, operate to gather and form the cover-fabric; the cotton batts $K^2$ are normally fed to the pleats by the roll H and the batt-breaker J; the lining-fabric $L^2$ is drawn through the formers M and by them provided with seam-ridges; the seam-ridges of the cover-fabric become nested in the seam-ridges of the lining-fabric by the co-action of the ridge-chains with the grooves of the forming-roll E; the nested seam-ridges pass from the ridge-chains onto the stationary fins 92; the sewing mechanisms advance with the work while the sewing-needles are in engagement with the seam-ridges; and the sewing mechanisms, after the completion of the sewing stitch, drop back to the normal position so as to be in readiness to begin a new stitch. The looper-needle co-acts with the sewing-needle in the manner described above; and the needles produce an interlock stitch in the manner illustrated in Figs. 48 and 49.

At suitable intervals, the rotation of the breaker-shaft J is arrested and the breaker is held while the batts are broken or severed and the work is carried forward a distance corresponding with the space between cushions.

The advance end of the cushion-cover 31 is released from the pins 136 by the stripper 137ª (Figs. 7, 26 and 29) when the latter pass downwardly about the front sprocket-wheels of the chains 135. In cases where a continuous cover-fabric is to be fed through the machine, the devices O may be employed for carrying and yieldingly holding the lateral edges of the fabric; or other suitable yielding tensioning means may be employed as a substitute for the devices O.

In all of the various mechanisms employed in the machine, provision is made for lateral adjustment to enable cushions having pleats of different widths to be formed on the machine.

The feed-rolls B and B³ are equipped with yielding rubber sleeves 157, as shown in Fig. 8. These rolls exert a strong pulling action on the materials and preferably rotate fast enough to cause a slight slippage of the rolls on the materials.

As appears from Figs. 11, 26 and 33, a curved shield, or hood, 158 is supported on the frame of the machine and covers the rear sprocket-shaft C'. The cover-fabric is fed over this shield.

As appears from Figs. 8, 11 and 12, the ridge-chains C² are supported by laterally adjustable tracks 159, these tracks being adjustably secured, by means of clips 160 which engage grooves 161 with which the cross-members of the main frame are provided.

Referring to Fig. 1ᵇ, the portions of the lining-sheet L² which connect the cushions 130 are designated 162. These portions may be so cut in separating the cushions as to provide skirts for attachment to the seat, or back, in the upholstering operation. Where a continuous cover-fabric is employed, both fabrics extend across the space between cushions, but the feed of the cotton batting preferably is interrupted, as explained above.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a cushion-making machine: means for feeding plies of fabric and forming nested seam-ridges and intervening pleats; means for sewing the seam-ridges; and means for delivering batts to the pleats and effecting severance of the batts, said last-mentioned means comprising batt-guides provided with shearing-edges, and a periodically arrested batt-engaging device co-acting with said shearing-edges.

2. In a cushion-making machine: means for feeding plies of fabric and forming nested seam-ridges and intervening pleats; means for sewing the seam-ridges; and means for delivering batts to the pleats and effecting severance of the batts, the last-mentioned means comprising a continuously rotating batt-feeding device, guides equipped with shearing-edges disposed back of said device, and a periodically arrested normally rotating breaker-roll having devices associated with said guides and operative to hold the batts while severance is effected.

3. In a cushion-making machine: means for feeding plies of fabric and forming nested seam-ridges and intervening pleats; means for sewing the seam-ridges; and means for delivering batts to the pleats and effecting severance of the batts, said last-mentioned means comprising a continuously rotating batt-feeding roll, batt-guides having severing edges disposed back of said roll, a normally feeding breaker-roll co-acting with said guides, means for periodically arresting said breaker-roll, and a deflector-roll interposed between said first-mentioned rolls.

4. In a cushion-making machine: means for feeding plies of fabric and forming nested seam-ridges and intervening pleats; means for sewing the seam-ridges; and means for delivering batts to the pleats and effecting severance of the batts, said last-mentioned means comprising a continuously operating batt-feeding roll, a normally feeding breaker-roll, means for periodically arresting the breaker-roll, and means whereby the intervals between stoppages of the breaker-roll may be varied.

5. A machine as specified in claim 4, characterized by batt-shearing edges interposed between the batt-feeding roll and the breaker-roll.

6. A machine as specified in claim 4, characterized by batt-shearing edges disposed between the batt-feeding roll and the breaker-roll, and a deflector-roll disposed adjacent the batt-shearing edges.

7. In a cushion-making machine: a main frame provided with a bed; ridge-chains mounted in said bed; a vertically adjustable cross-head disposed over the front portions of said ridge-chains; a forming-roll journalled in said cross-head; means mounted on said cross-head for guiding a fabric to the forming-roll; a batt-feeding roll mounted on the cross-head; batt-guides disposed back of said cross-head; a normally feeding breaker-roll associated with said batt-guides; and means for periodically arresting said breaker-roll.

8. A machine as specified in claim 7, characterized by a continuously rotating deflector-roll mounted on said cross-head.

9. A machine as specified in claim 7, in which the guides and breaker-roll are mounted on the main frame back of said cross-head, and a concave cross-member carried by the main frame is associated with the batt-feeding roll and with the front ends of the batt-guides.

10. A machine as specified in claim 7 having means which must be adjusted when the intervals between the stoppages of the breaker-roll are to be varied.

11. A machine as specified in claim 7 having means which must be adjusted when the intervals between the stoppages of the breaker-roll are to be varied, and having means for varying the non-rotating period of the breaker-roll.

12. A machine as specified in claim 7, in which is employed a forming-roll having seam-accommodating grooves formed by adjustable collars enabling the distance between said grooves to be varied.

13. A machine as specified in claim 7, employing a grooved forming-roll above the ridge-chains and spaced shoes between the ridge-chains and cooperating with the forming-roll.

14. In a cushion-making machine: a bed provided with mechanism for carrying a fabric; means co-acting with said mechanism for gathering the fabric and forming seam-ridges and intervening pleats; and auxiliary lateral fabric-carrying devices comprising yieldingly mounted traveling devices equipped with fabric-engaging means.

15. A machine as specified in claim 14, in which the auxiliary fabric-carrying device comprises a yieldingly held swinging chain-support, a chain mounted on said support and equipped with fabric-engaging devices, and means for actuating said chain regardless of the movements of said support.

16. A machine as specified in claim 14, in which the auxiliary fabric-carrying device comprises a chain-support pivotally mounted at its rear portion and laterally slidable at its front portion, yielding means tending to prevent the front end from swinging inwardly, and a continuously operated endless chain mounted on said support.

17. In a cushion-making machine: a main frame provided with a bed; a series of ridge-chains mounted on said bed; a series of formers co-acting with said ridge-chains to form seam-ridges and intervening pleats; and means including a plurality of eccentric shafts carrying said formers and connected to rotate substantially in unison to simultaneously adjust said formers.

18. In a cushion-making machine: a main frame provided with a bed; a series of ridge-chains mounted on said bed; a series of formers co-acting with said ridge-chains to form seam-ridges and intervening pleats; and means for simultaneously adjusting said formers, said means comprising a pair of crank-shafts upon which said formers are mounted, and means for simultaneously actuating said crank-shafts.

19. In a machine of the character set forth: means for feeding plies of fabric and forming nested seam-ridges and intervening pleats; means for sewing the seam-ridges; means for delivering batts to the pleats and effecting severance of the batts, said last-mentioned means comprising members provided with shearing edges and a periodically arrested batt-engaging device coacting with said shearing edge; and shiftably related and positively actuated feed rolls disposed in front of the sewing means for pulling said fabrics from said sewing means.

20. In a machine of the character set forth; means for feeding plies of fabric and forming nested seam-ridges and intervening pleats; means for sewing the seam-ridges; means for delivering batts to the pleats and effecting severance of the batts, said last mentioned means comprising members provided with shearing edges and a periodically arrested normally rotatable breaker roll coacting with said shearing edge; and shiftably related and positively actuated feed rolls disposed in front of the sewing means for pulling said fabrics from said sewing means.

21. In a machine of the character set forth: means for feeding plies of fabric for forming nested seam-ridges and intervening pleats; means for sewing the seam-ridges; means for delivering batts to the pleats and means for effecting severance of the batts; said last mentioned means comprising members provided with shearing edges, and a periodically arrested batt-engaging device coacting with said shearing edges.

22. A machine as specified in claim 7 having means for varying the non-rotating period of the breaker-roll.

23. A machine as specified in claim 7 having a plurality of gears for driving said breaker-roll; and a member pivoted on said frame rotatably journaling one of said gears, said gear being adapted to be replaced by another to vary the intervals between the stoppages of the breaker-roll.

24. In a cushion-making machine: a main frame provided with a bed; a series of ridge-chains mounted on said bed; a series of formers co-acting with said ridge-chains to form seam-ridges and intervening pleats; and mechanism for simultaneously raising and lowering said formers.

25. A machine as specified in claim 24, in which said formers have longitudinal channels disposed over said ridge-chains and said formers have their rear ends so positioned as to form the intermediate pleat first and then form the pleats in succession in both lateral directions from the intermediate pleat.

ALLISTER S. MITCHELL.